May 6, 1930.  J. P. BUNCE  1,757,616
HOPPER, DRIER, AND ROASTER
Filed June 10, 1927
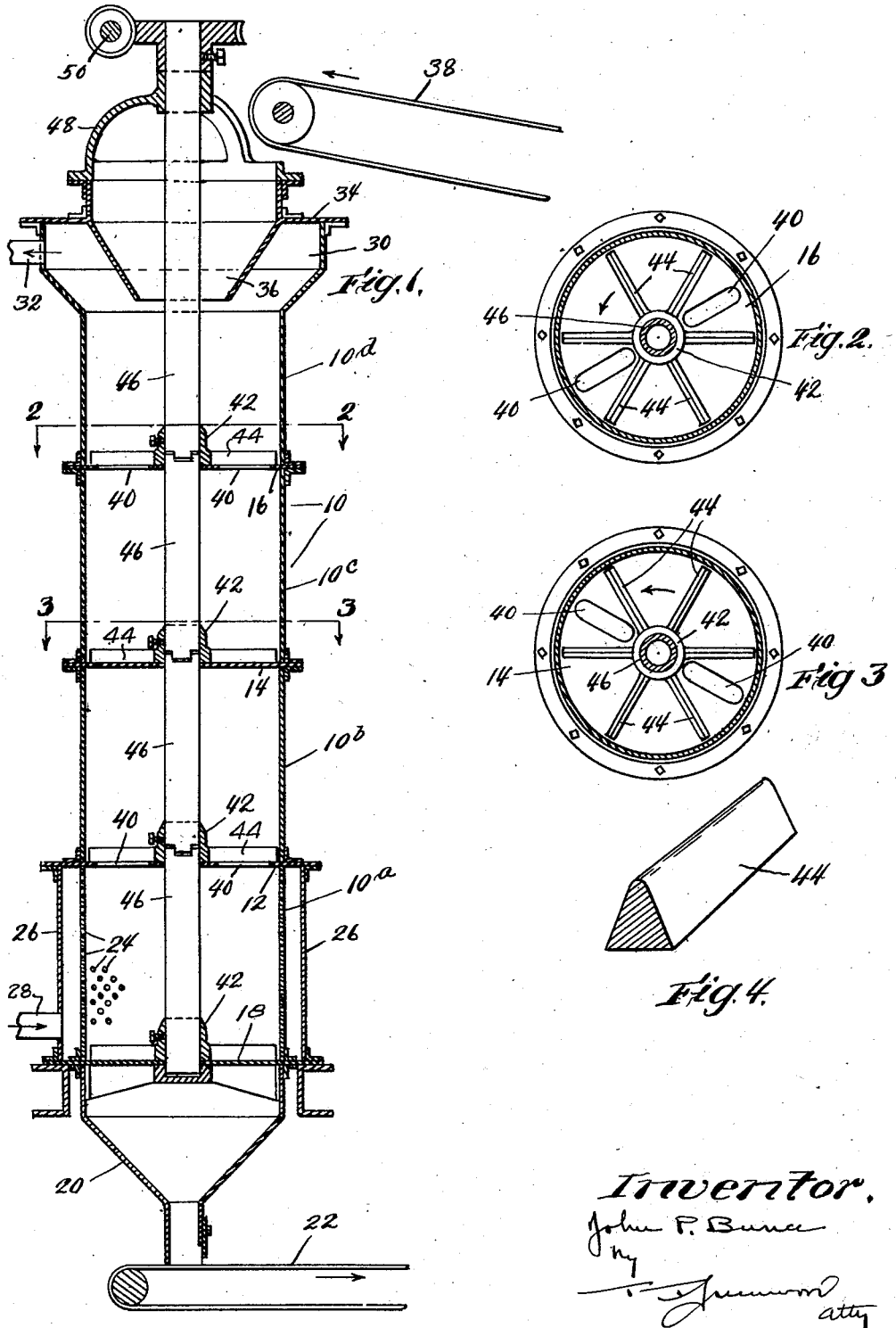
Inventor,
John P. Bunce
by
 atty Patented May 6, 1930

1,757,616

UNITED STATES PATENT OFFICE

JOHN P. BUNCE, OF GREENFORD, ENGLAND

HOPPER, DRIER, AND ROASTER

Application filed June 10, 1927. Serial No. 197,970.

This invention relates to hoppers adapted to contain a supply of flowable solid material, as material in small pieces or particles, from which the material is adapted to flow by gravity in a continuous stream; and to continuous driers and roasters for such material wherein the material to be dried and roasted is supported in a more or less vertical column and is adapted to move continually downward by gravity and to discharge a continuous stream of dried and roasted material from the lower end of the column.

The invention has particular reference to the drying and roasting of cocoa beans and nibs, although not limited to such material.

When material composed of small pieces or particles is supported in a relatively high column considerable difficulty is experienced in withdrawing a continuous stream of the material by gravity from the bottom of the column due to the packing of the material by its weight to form an arch between the side walls over the discharge opening, which arch supports the column of material thereabove and prevents the free flow of the material.

It is an object of this invention to provide a chamber or stack for a hopper, drier or roaster adapted to support a vertical column of material, as cocoa beans or nibs with means to, in effect, separate the column into a plurality of superposed short columns, the heights of which are adapted to be sufficiently small to prevent packing of the material, combined with power-actuated means to maintain the material in the short columns in continuous motion and to feed the material in a continuous manner by gravity from an upper column into a lower column and out of the lowermost column.

A further object of the invention is the provision of a chamber, as a vertical tube, adapted to contain a column of the material, with apertured partition-plates, or diaphragms, extended transversely across the tube at spaced intervals along the height thereof to separate the column into a plurality of short columns and provide supports for the short columns, combined with means to keep the material in the short columns continuously in motion, thus to prevent bridging of the material and to insure the gravity-feeding of the material from an upper column into the next lower column.

A further object of the invention is the provision of a drier and roaster constructed as above set forth with means to pass a heated gas, as air, through the entire height of the column and dry and roast the material.

It is also an object of the invention to provide the roaster with means to maintain a constant supply of material therein so that dried or roasted material can be withdrawn in a continuous manner from the bottom of the column.

A further object of the invention is generally to improve the construction and operation of hoppers and continuous driers and roasters.

Fig. 1 is a sectional elevation of a continuous drier and roaster embodying the invention.

Fig. 2 is a section along line 2—2 of Fig. 1.

Fig. 3 is a section along line 3—3 of Fig. 1.

Fig. 4 is a perspective detail of one of the arms for rotating the material.

The continuous drier and roaster embodying the invention comprises a vertical stack 10 composed of a plurality of superimposed short cylindrical detachably-connected sections $10^a$, $10^b$, $10^c$, $10^d$, which sections are separated by partition-plates or diaphragms 12, 14 and 16, forming the bottom walls of the sections $10^b$, $10^c$ and $10^d$ respectively. A similar diaphragm 18 comprises the bottom wall of the lowermost section $10^a$. A discharge nozzle or chute 20 is disposed beneath said diaphragm 18 and is adapted to receive the roasted material in the stack and guide it upon the movable conveyor belt 22.

The lowermost section $10^a$ has a plurality of perforations or openings 24 therein surrounded by a jacket 26. A heated gas, as hot air, is adapted to enter the space between said side wall and jacket through a pipe 28 and pass through the perforations into the lowermost section and thence upwardly through the sections and the apertures in the diaphragm. The upper section $10^d$ is provided with an enlarged portion 30 at its upper end into which the roasting gases are adapted to collect and pass from the stack through the discharge pipe 32. The enlarged portion 30 is provided with a cover plate 34 which carries an entrance hopper or chute 36, the lower open end of which extends into the enlarged portion 30 of the upper section. The top of the entrance hopper is open and material is adapted to be introduced therein by a conveyor belt 38 or other suitable means to maintain a constant supply of material therein.

The diaphragms 18, 12, 14 and 16 are provided with suitable discharge apertures 40, the diaphragms here shown being provided with two elongated and diammetrically opposed apertures as shown in Figs. 2 and 3. Preferably the apertures of diaphragms are staggered with respect to each other as indicated in Figs. 2 and 3 so that the material cannot fall directly down the stack, and also so that the hot gases will be caused to circulate more uniformly throughout the material in each section.

The material in each section is adapted to be maintained in continuous motion by spiders 42 which are supported and rotate upon the diaphragms and have outstanding arms 44 of preferably triangular shape which extend over the diaphragms into close proximity with the cylindrical walls of the sections. Each spider is provided with a short vertical driving shaft 46 and the shafts at the spiders have a tongue and groove connection with each other so that all shafts are driven jointly. This arrangement facilitates the assembling and disassembling of the stack. The uppermost shaft 46 is extended through the entrance hopper 36 and has a bearing in the spider 48 carried by said entrance hopper and is adapted to be slowly rotated by a continuously driven shaft 50 through suitable reduction gearing.

The speed of rotation of the spiders together with the speed of the conveyor belt 22 determines the rate at which the material is passed through the stack. The height of the stack sections are adapted to be such that for a given material the weight of the material supported by the diaphragm of each section is sufficiently small to prevent the packing of the material therein so that, while the stack may be relatively high, each diaphragm supports only the relatively small weight of material in its section. With a proper relation between the diameter and height of the section for a specific material, as when the height of the section is approximately equal to the diameter thereof, the spiders cause the mass of material to rotate as a unit upon the diaphragms and thus effectively prevent the bridging of the material and insure constant feeding of the material at a uniform rate through the apertures in the diphragms. When the height of the sections is sufficiently great as, for instance, when the height materially exceeds the diameter of the section, the upper portion of the material in the section may rotate at a slower rate than the bottom portion of the material so that there is a continuous shifting of position of the particles in the section. For the drying and roasting of certain materials, this arrangement may be particularly desirable as it effects a uniform contact of all portions of the material with the hot gases. The diaphragms are provided with a sufficient number of apertures 40 to insure an adequate flow of gases upwardly through the sections; and the rotation of the material in the sections combined with the staggering of the apertures in the diaphragms serves to bring all particles of the material in contact wth the gases.

When the apparatus is to be used as a hopper for the storage and delivery of material, it is obvious that the means for circulating heated gases through the stack can be dispensed with and for certain purposes the conveyor belt 22 also.

The construction may be otherwise modified without departing from the spirit of the invention.

I claim:

1. Apparatus of the class described comprising a vertical cylindrical stack composed of a plurality of superimposed sections, apertured diaphragms separating the sections, the side walls of the lowermost section above the lowermost diaphragm being vertical and having openings therethrough, a jacket surrounding the opening, means to pass a heated gas into said jacket and through the opening into the lowermost section, means to withdraw gas from the uppermost section, an entrance for material into the uppermost section, a discharge duct disposed beneath the diaphragm of the lowermost section, and armed spiders rotatable over said diaphragms and the apertures therein.

2. Apparatus of the class described comprising a vertical cylindrical stack having a plurality of superimposed detachably-connected sections, apertured diaphragms separating said sections, and a sectional shaft extended co-axially through said stack and the diaphragms and having outstanding arms rotatable over said diaphragm and the apertures therein, each shaft section having approximately the height of the stack-section in which it is located and carrying its arms at the lower end thereof, said shaft-sections having intermeshing toothed ends by which the sections are connected in driving relation.

3. The method of treating granular material for roasting it by the use of a vertical cylindrical stack composed of a plurality of vertical cylindrical sections having horizontal diaphragms which separate the sections, each diaphragm having an aperture therein, with the apertures in the diaphragms being staggered, and a vertical rotatable shaft extended co-axially through said stack and said diaphragms and having fixed thereto outwardly-extended arms which closely overlie the top faces of said diaphragms, which method consists in filling the vertical sections so full of granular material that the material over an aperture in an upper diaphragm is supported by the material in the next lower section, withdrawing material from the lowermost section, whereby some support is removed from the material in the next upper section and material therefrom is caused to flow into the next lower section, and rotating said shaft with its arms and thereby the cylindrical masses of material in the sections, whereby to present continuously new bottom-portions of said masses to the diaphragm-apertures so that the material can flow continuously therethrough when its support on the material in the next lower section is decreased by the withdrawal of material therefrom.

4. The method of treating granular material for roasting it which consists in forming a plurality of co-axially aligned vertical columns, an upper one of which is only partially supported on the next lower one at vertically-staggered eccentric places, withdrawing material from the lowermost column so that some support is removed from the next upper column and material is caused to flow from the next upper to the next lower column to restore the support, and rotating the column so that new portions of the bottoms thereof are continuously presented to the supporting places and thereby to cause material of the column to flow continuously from one column to the next lower column in proportion as material is withdrawn from the columns and the support therefor is removed.

5. The method of treating granular material which consists in supporting a portion of one side of the bottom column of the material upon the top of a lower column of the same material, withdrawing material from the lower column, and thereby removing some support from the upper column and causing material from the upper column to flow downwardly onto the top of the lower column to restore the support, and rotating the upper column so as to present successive portions thereof to be supported by and to flow downwardly upon said lower column.

In testimony whereof, I have signed my name to this specification.

JOHN P. BUNCE.